Figure 1:
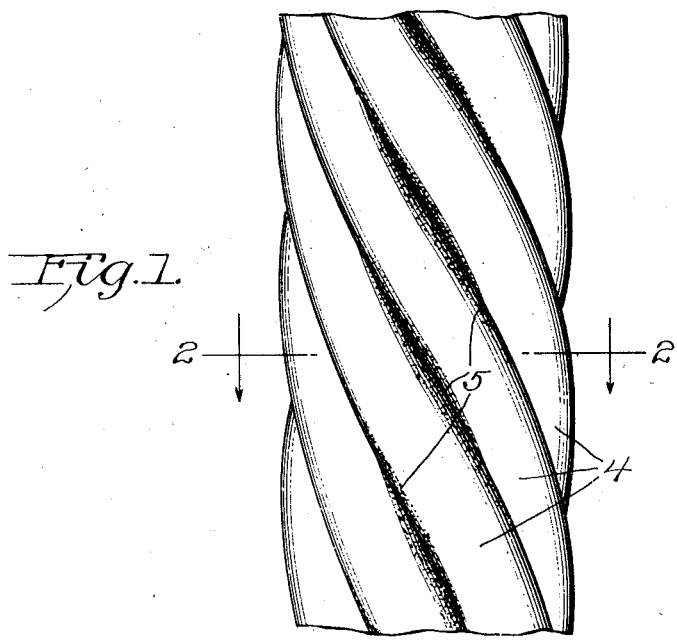

R. MATTICE.
ELECTRODE FOR ELECTRIC WELDING.
APPLICATION FILED MAY 17, 1920.

1,361,269.                    Patented Dec. 7, 1920.

Inventor:
Royal Mattice
by
Attys.

UNITED STATES PATENT OFFICE.

ROYAL MATTICE, OF MIDDLETOWN, NEW JERSEY.

ELECTRODE FOR ELECTRIC WELDING.

1,361,269.  Specification of Letters Patent.  Patented Dec. 7, 1920.

Application filed May 17, 1920. Serial No. 381,880½.

*To all whom it may concern:*

Be it known that I, ROYAL MATTICE, a citizen of the United States, residing at Middletown, in the county of Monmouth and State of New Jersey, have invented certain new and useful Improvements in Electrodes for Electric Welding, of which the following is a specification.

The present invention has to do with certain improvements in electrodes for electric welding purposes. The invention has particular reference to electrodes intended for welding iron and steel and the various compounds or alloys thereof, but it will presently appear that the features of the invention are not limited to this particular class of service. In order, however, that the features of the invention may be better understood and their significance appreciated, I will first explain briefly the general nature of the operation in an electric welding process and will also point out certain of the inherent difficulties ordinarily met with in this class of work.

When two bodies of metal, such, for example, as carbon steel, are to be electrically welded together, the welding heat is generated either by passing a current between said bodies, bringing them into more or less perfect contact, in which case the heat is generated by the resistance at the point of contact between said bodies; or by drawing an arc between the bodies, the current itself still flowing from one of the bodies to the other: or the welding heat may be supplied by using one or both of said bodies as one electrode of an electric couple, the other electrode being a separate body from those which are to be welded. In such case either or both of the bodies which are to be joined together will be connected to one side of the line and the specially provided electrode will be connected to the other side of the line, so that the current will flow between said electrode and one or both of the bodies under weld.

When the process is conducted in the last mentioned manner—that is, by the use of a specially provided electrode—there will be a transfer of material in the direction of the positive side of the circuit; and if the bodies under weld are themselves on the positive side there will be a tendency for a portion of the material of the electrode to be transferred to and deposited upon the bodies under weld at the point of the arc. This will tend to result in an improved weld, since it will tend to insure a more perfect conjoining of the structures of the two members which are being joined together.

The perfection of weld which may be consummated in this manner will depend largely upon the steadiness and perfection of the arc which may be generated, since if the arc be given to "fluttering" or movement from point to point it will be very difficult for the operator to insure the maintenance of the arc at any given point accurately for the desired length of time.

The ability to secure uniform operation of the welding arc is largely affected by the degree of hardness and composition of the materials being welded as well as of the electrode itself. The higher carbon steels, as well as the so-called "alloy" steels such as nickel, chromium, vanadium, tungsten, etc., have in the past been found very difficult to satisfactorily weld by the use of the electric arc. This difficulty has been found to be largely caused by the fact that the arc in such cases tends to rove or stray from point to point on the electrode itself, and therefore tends in like manner to be carried to different points on the surface of the articles under weld. This tendency to rove or stray is, furthermore, greatly heightened by the increased size of electrodes which must be used for carrying the larger currents necessary in order to generate the welding heat in such cases. Naturally, the larger the electrode, the more tendency there is for the arc to wander about it from point to point.

Now the tendency for the arc to rove or stray in this manner is found to be due largely to inequalities in the composition of the material of the electrode itself. It is practically impossible, in the manufacture of electrodes or wires of any appreciable size, to subject them to such a treatment that they will be of absolutely uniform composition and hardness throughout. It almost invariably results that hard spots, or at any rate spots of varying conductivity, and generally of greatly increased resistance, are found scattered throughout the material of the electrode. In the welding operation the material of the electrode itself is consumed; and when the arc reaches one of these spots of increased hardness or materially changed conductivity, generally increased resistance, the energy of the arc is for the time being largely diverted from its primary purpose— that of bringing about the welding heat—to the subordinate, though for the time being necessary, purpose of getting rid of the hard and objectionable spot in the electrode itself. The result is that either the arc will have to wander to some other point where its effective energies may not be so seriously impeded, or else the arc will probably go out entirely. At any rate, the welding operation is thus caused to be irregular and uncertain and cannot be accurately controlled by the operator.

If it were possible to use a relatively small electrode, it might be possible to secure one of a fair degree of uniformity of hardness and composition, in which case the afore-mentioned objection might be largely overcome. Or, on the other hand, if some means might be devised for compensating for the inequalities of composition and hardness at various points in the electrode, it might be possible to secure a sufficiently large electrode of such over-all composition and hardness as to give the desired uniformity of action.

I have discovered the fact that by the use of an electrode in the form of a stranded cable or the like, made up from a number of individual wires or strands twisted or laid together, it is possible to compensate for the inequalities of composition and hardness at various points in the electrode, and at the same time secure an electrode of sufficient size and carrying capacity to meet the needs of the problem. It is a fact that by the use of a stranded electrode, in case one of the strands or wires has a hard spot, the other wires will carry the current to the point of delivery, thereby giving a good, steady arc and not only preventing loss of time and material but also making it possible for the operator to much more accurately control and manipulate the welding action.

The stranding of the electrode may be accomplished in various ways, as, for example, by using a core wire or strand in conjunction with one or more layers of other wires or strands laid about the same. Where a single core wire or strand is used, it is possible to place six other wires or strands of the same diameter around the core, making a total of seven in the cable. These seven may either be laid straight, in which case suitable binders may be used for holding the strands together, or the various strands may be otherwise joined either periodically or continuously, as, for example, by welding them together in spots. On the other hand, the outside wires or strands may be twisted around the core in the familiar manner, in which case they will ordinarily hold their position with sufficient permanency to make unnecessary the use of any special binding or attaching means.

Furthermore, each wire or strand of the cable may in itself be composed of a single element or of a number of finer wires laid together; in which case the degree of refinement in the completed cable will be multiplied. This type of construction is particularly desirable in those cases where very heavy currents are to be used, thus making necessary the use of correspondingly large electrodes.

Now, the use of a stranded wire or cable for electrical conduction shows a better "kick" than the use of a solid wire of equal cross-sectional area, owing to the change of internal energy manifested in the material of the cable itself. It is well understood in the art that a solid wire or conductor does not allow an electric current to pass through it as readily as does a stranded wire or cable, because the molecular mobility is much greater in the stranded conductors than in the solid ones. This is due to the fact that by the use of the stranded conductor the elements of its material are allotrophized, thereby changing the number or arrangement of the atoms in the molecules; so that as the molecules are brought together the reaction due to the re-arrangement of the atoms is hastened or augmented and accelerated, so that the stranded wire or cable shows a vast improvement in the welding action over that which is secured by a solid electrode.

The use of a stranded electrode also makes it possible for me to still further control the action and the usefulness of the electrode in the following manner: In many cases it is desirable to use an electrode of high carbon or alloy material, but experience teaches that when material of this kind is used the tendency for the arc to fly to one side or stray from point to point is augmented. If, on the other hand, the stranded electrode be composed of a central core of high carbon or alloy steel surrounded by a series of strands or wires of low carbon or alloy material, the deleterious effect of the high carbon or alloy material will be eliminated or reduced, because the arc will at all times play in a practically uniform and constant manner on the surrounding low carbon or alloy strands.

It is to be observed, furthermore, that when round wires or strands are used in building up the electrode its outer surface will be fluted or corrugated, the flutes extending straight along its length or spiraling according as the strands are laid parallel to or twisted about the core. There are also provided a series of longitudinally extending interior passages within the electrode. It is frequently desirable or necessary to use a flux or other cleansing agent at the point of weld, and these flutes or corrugations, as well as the interior passages afore-mentioned, will constitute excellent points or carriers for such material. In such case the electrode may be initially manufactured with the flux material introduced into the longitudinally extending passages or the flutes, or both, if desired; or said flux material may be there introduced afterward or at the time of use for the welding operation.

Inasmuch as the features of the present invention may be used in connection with electrodes built up in a large number of manners, as, for example, by increasing or decreasing the number of strands, laying them straight or twisted, laying them in one or more layers about a core, or in many cases eliminating the core itself, I have only deemed it necessary to illustrate one embodiment of my invention in the accompanying drawing.

Figure 2:
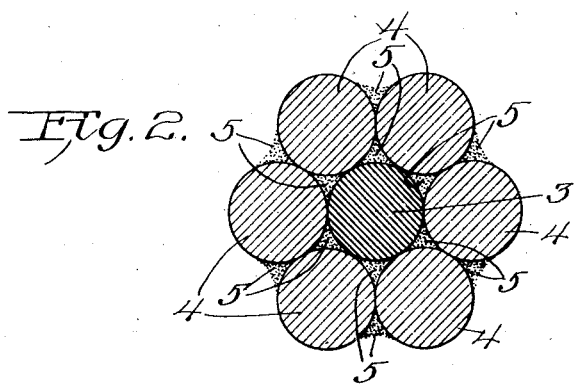

In the drawing, Figure 1 shows a longitudinal elevation of a section of stranded electrode embodying the present invention; and Fig. 2 shows a cross-section of the electrode of Fig. 1, taken on the line 2—2 looking in the direction of the arrows;

The electrode illustrated in the drawing includes a core strand 3, and a series of outer strands 4 twisted about said core strand, there being six of the outer strands in the particular form illustrated. I have also indicated by the shading or cross-hatching the fact that the core strand is, in the form illustrated, of different material from the outer strands, but it will be understood that I do not limit myself to the use of such different material for the core strand except as I may do so in the claims.

I have also shown within the interstices or flutes 5 the presence of foreign material such as resin or other fluxing material, and have also illustrated the same in the spaces between the strands and the core. The presence of this fluxing material within the flutes or between the strands and the core will greatly enhance the effectiveness of the flux, and insure a more perfect fluxing action in those cases in which it is used.

I claim:

1. As a new article of manufacture, an electrode for electric welding consisting of a stranded cable comprising a central core strand or wire of one composition or material, a series of other strands or wires twisted about said core strand or wire and of another material or composition, and suitable flux material within flutes or spaces between the various strands or wires, substantially as described.

2. As a new article of manufacture, an electrode for electric welding consisting of a stranded cable comprising a central core strand or wire of desired composition or material, and a series of other strands or wires of desired composition or material laid about said core strand or wire, and suitable flux material in the flutes or spaces between the various strands or wires, substantially as described.

3. As a new article of manufacture, an electrode for electric welding consisting of a cable comprising a core strand or wire, and a series of other strands or wires surrounding the same, and suitable flux material within the flutes or spaces between the various strands or wires, substantially as described.

4. As a new article of manufacture, an electrode for electric welding consisting of a cable comprising a central core strand or wire of one material or composition, and a series of other strands or wires of different material or composition surrounding the core strand or wire for the purpose specified, substantially as described.

5. As a new article of manufacture, an electrode for electric welding consisting of a cable comprising a core strand or wire, and a series of other strands or wires surrounding the same, all for the purpose specified, substantially as described.

6. As a new article of manufacture, an electrode for electric welding consisting of a cable comprising a core strand or wire of relatively hard material, and a series of other strands or wires surrounding the core strand or wire and of relatively soft material, all for the purpose specified, substantially as described.

7. As a new article of manufacture, an electrode for electric welding, consisting of a series of strands of welding material laid together, one of said strands being of relatively hard material and the other strands being of relatively softer material, all for the purpose specified, substantially as described.

ROYAL MATTICE.